May 12, 1953        E. W. MILLER        2,638,036

DOUBLE-ACTING GEAR SHAPING MACHINE

Filed March 2, 1945        6 Sheets-Sheet 1

May 12, 1953 — E. W. MILLER — 2,638,036
DOUBLE-ACTING GEAR SHAPING MACHINE
Filed March 2, 1945 — 6 Sheets-Sheet 2

Patented May 12, 1953

2,638,036

UNITED STATES PATENT OFFICE 2,638,036

DOUBLE-ACTING GEAR SHAPING MACHINE

Edward W. Miller, Springfield, Vt., assignor to The Fellows Gear Shaper Company, Springfield, Vt., a corporation of Vermont Application March 2, 1945, Serial No. 580,511

10 Claims. (Cl. 90—8)

The present invention relates to gear shaping machines. Among its objects and accomplishments, not heretofore realized by machines of this class are the following:

To provide a plurality of cutters in combination with means for reciprocating them so arranged and operated that cuts are made throughout the axial length of the work gear in each stroke in both directions of reciprocation; to provide in combination with the foregoing, means by which either spur or helical gears may be cut; to combine with reciprocating opposed cutters new and improved means for causing the inactive cutter to be backed off or withdrawn from the work throughout its return stroke and at the same time to hold the active cutter in advanced cutting position; to apply the foregoing principles to a single cutter adapted to generate teeth in a gear adjacent to a shoulder which protrudes beyond the circumference of the gear; to provide a double acting single cutter for operation by the same means and to the same effect as two opposed cutters; and to accomplish the same objects by cutters of both rack tooth character having one or a plurality of teeth and circular cutters having teeth arranged similarly to spur or helical gear teeth. Other objects subsidiary and related to the foregoing appear in the following description of illustrative embodiments of the invention, as do also the principles and particulars in which the invention consists.

Referring to the illustrative drawings accompanying this specification,

Fig. 18 is a horizontal section taken on line 19—19 of Figs. 16, 17 and 20;

Figs. 20 and 21 are longitudinal vertical sections taken on lines 20—20 and 21—21, respectively, of Figs. 17 and 19.

Like reference characters designate the same parts wherever they occur in all the figures.

The cutters and means for operating them shown in Figs. 2–15 inclusive are designed for use in connection with a machine like that shown in my Patent No. 2,387,166, granted October 16, 1945, entitled Automatic Gear Grinding Machine, in substitution for the grinding wheels and related parts shown in that patent. By virtue of such substitution the machine is enabled to generate teeth initially in an uncut blank work piece.

Figure 1:
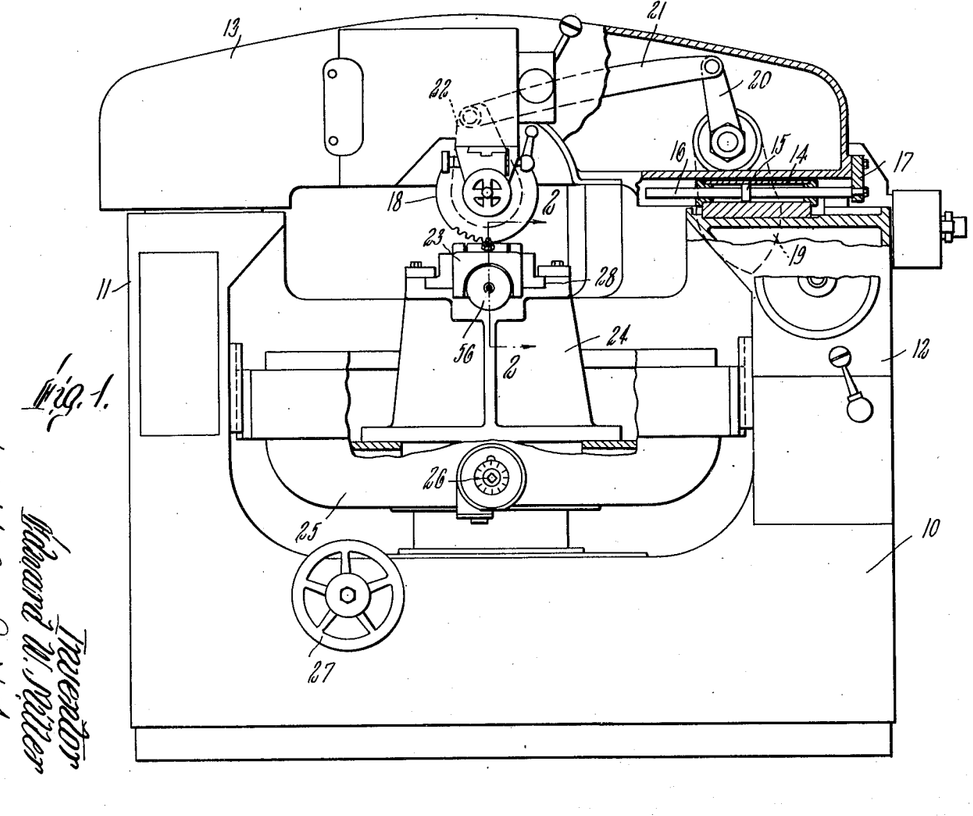
Fig. 1 is a front elevation of a gear shaping machine containing the invention.

The general principles of the machine are illustrated in Fig. 1 and will be briefly described. A base 10 supports separated columns 11 and 12 on which a work carriage 13 rests, bridging over the space between the columns. The carriage is reciprocated by any suitable reversible motive means, here shown as a hydraulic cylinder 14 containing a piston 15 which is coupled by means of a piston rod 16 and bracket 17 with the carriage. A work spindle supports and imparts rotation to a work piece 18, and is itself rotated in opposite directions in time with the reciprocations in opposite directions of the carriage, its rate of rotation being controlled by a former 19, abutments, not shown, and linkage 20, 21, 22, all like in principle to the rotation controlling means of said prior patent, so that the compound movement imparted to the work piece is the same as that of a gear rolling along a stationary rack beneath it.

The cutters are mounted on a cutter carriage 23 which is mounted for reciprocating motion, in a path transverse to that of the work carriage 13, on a pedestal 24 which is in turn mounted on a stool 25. The stool is supported by the base with provisions for up and down adjustment to accommodate the cutters to work pieces of different diameters, and for angular adjustment to dispose the tools for generating spur gears or helical gears of any degree of obliquity. A shaft 26, the outer end of which is accessible for rotation by a wrench, serves to adjust the stool vertically, and a hand wheel 27 serves to adjust it angularly.

The details of all of the means here briefly described are fully shown in the patent before named, and its disclosure is made, by reference, a part of the present disclosure.

The cutter carriage 23 is mounted for reciprocation in guideway 28 of the pedestal. It carries two cutter holders 29 and 30 on which, respectively, cutters C and C¹ are mounted. Each of the cutters shown in Figs. 2, 3 and 4 has a single tooth designated by the reference characters C and C¹, respectively, which projects from the upper side at one end of the body portion 31 of the cutter. The tooth has the shape in cross section of a rack tooth conjugate to the teeth to be generated in the work, and the intersections of its top and side faces with its end face form cutting edges. These faces are suitably inclined to provide cutting clearance and whatever top rake may be needed. The cutter bases or bodies 31 are set into channels in the upper sides of the holders 29 and 30, and clamped therein by clamp blocks 32 and screws 33, as clearly shown by the drawings. By being mounted in this manner, each cutter is capable of adjustment lengthwise as needed to compensate for removal of material from its forward end in sharpening. It is adjusted, and held up to the work during its cutting strokes, by a screw 34 threaded into an offset part of the holder in parallel alinement with the path of adjustment of the cutter, and one end of which bears against the rear end of the cutter base.

Figures 2, 3, 4, 5, 6:
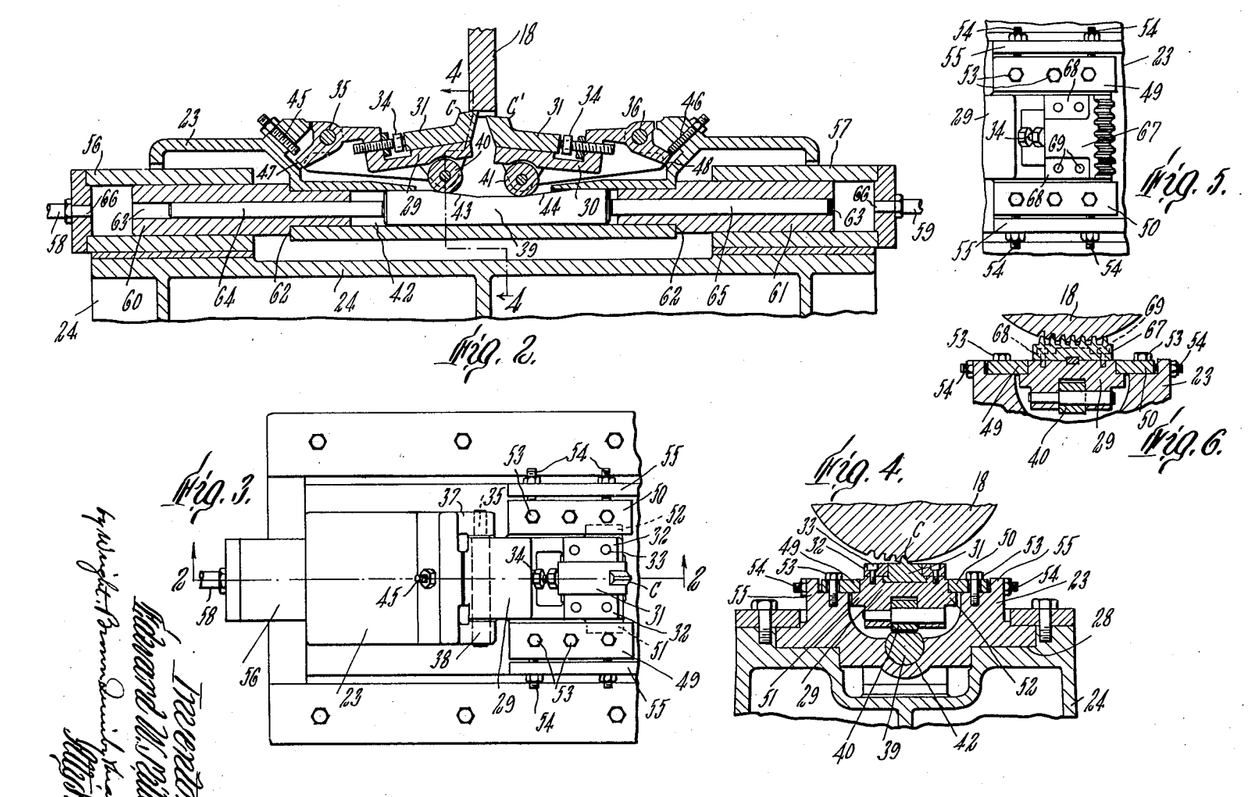
Fig. 2 is a sectional view of the cutter carriage, two opposed cutters carried thereby, and operating means, taken on line 2—2 of Fig. 1.
Fig. 3 is a plan view of the left hand end of the carriage and the left hand cutter shown in Fig. 2.
Fig. 4 is a cross section taken on line 4—4 of Fig. 2.
Figs. 5 and 6 are fragmentary views similar to Figs. 3 and 4, respectively, showing a rack type cutter having a series of teeth in substitution for the single toothed cutter shown in the preceding figures.

The cutter holders 29 and 30 are coupled with the carriage 23 by pivots 35 and 36, respectively, the ends of the pivot 35 being contained in bearings in lugs 37 and 38, which embrace the outer end portion of the holder 29, as shown in Fig. 3, and the pivot 36 being similarly engaged with lugs (not shown) which are similarly related to the holder 30; the bearings for the two pivots being widely separated from each other in the path of movement of the carriage, and each holder being arranged to extend toward the other so that the active extremities of the cutters are opposed to one another and near together. The space between them is narrower than the face width of most gears whereby, during the stroke of the carriage in either direction, one cutter enters the work and performs a substantial fraction of its cutting stroke before the other passes away from the work, and cuts are completed in the course of each stroke of the carriage with a length of stroke only slightly longer than is required for shaping gear teeth by a single acting cutter-carrying ram or spindle.

Each cutter is backed off from the work after finishing its return stroke, and advanced into cutting position prior to making its working stroke, by angular movement of its holder about the pivotal axis thereof under control of a displacer 39. The axes of pivots 35 and 36 are transverse both to the path of the carriage and to the radius of the workpiece in which the pitch point between the cutters and the teeth being generated lies, wherefore the angular movements of the cutter holders back off the cutters in proper manner to avoid rubbing contact with the work during their return strokes.

Rollers 40 and 41, connected by pivot pins to the under parts of the respective cutter carriers, substantially as shown by Figs. 2 and 4, rest on the upper side of the displacer 39. The latter is substantially longer than the center distance between rollers 40 and 41, and is arranged with its length dimension extending in the direction of movement of the carriage, and it is mounted in a passage or guide 42 in the carriage with capability of movement endwise therein relatively to the carriage. It has a depression in the midlength of its upper side, the end portions of which are formed by gently sloping ramps or cam surfaces 43 and 44. Ramp 43 underlies roller 40 and ramp 44 underlies roller 41. Thus when the displacer is moved to the right (with respect to the showing in Fig. 2), ramp 43 elevates holder 29 and holder 30 is lowered by recession of ramp 44; and the opposite effect takes place when the displacer is moved from right to left.

In the arrangement shown, gravity causes the holders to descend following recession of the ramps, but it is within my contemplation to employ springs or positive cam means for that purpose in embodiments where gravity cannot be availed of. Adjustable stop screws 45 and 46 are mounted in the carriage for cooperation with shoulders 47 and 48 on the cutter holders so as to limit backing off movement of the cutters to less than that permitted by the displacer ramps, as desired. A very slight displacement is sufficient, much less than that shown in the drawings, which is exaggerated for clearness. Other stops in the form of hold-down gibs 49, 50 on the carriage, overlapping flanges 51 and 52 of each holder, limit rising movement of the holders. Preferably these latter stops are located so as to prevent the ramps from lifting the holders to the full extent that would be possible if the holders were not thus restrained, whereby the rollers cause the movement of the displacer to be arrested, being in engagement with the ramp at a point below its highest point, when the respective holder is arrested by its gibs 49 and 50.

The gibs 49 and 50, besides serving as stops in the manner above described, also restrain the cutter holder against movement transversely of the cutting travel and form part of means for adjusting the holder transversely. The holes in them through which the clamping bolts 53 pass are wider than the shanks of the bolts, and adjusting screws 54 are threaded through flanges 55 on the carriage to bear on the outer boundaries of the gibs. Sufficient space is provided between the two flanges 55, and between the pivot bearing lugs 37 and 38, to permit the cutter and path in which it travels to be located exactly in a prescribed relation to the work. The foregoing description applies equally to both cutters.

It may be noted that, as shown in Fig. 2, the bottoms of the channels in the holders which receive the cutter bases are substantially or nearly parallel to the clearance angle of the top face of the cutter tooth. This relationship enables the extremity of the cutter to be placed, by adjustment of the screw 34, after sharpening, in exactly the same location with respect to its prescribed cutting path after sharpening as before sharpening.

In operation the carriage 23 is moved back and forth a distance sufficient to give full cutting strokes to both opposed cutters, and the displacer is moved relatively to the carriage in the same directions before the carriage begins to move, or at least at an early enough stage to cause the non-operating cutter to be backed off and the operating one advanced, in time to avoid rubbing, and effect cutting, respectively. Hydraulic means are here shown for moving the cutter carriage and displacer, such means being adapted for use with the machine shown in my prior Patent No. 2,387,166, which is designed for hydraulic operation. Cylinders 56 and 57 are mounted on the pedestal 24 in opposition to each other at opposite ends of the carriage, and are connected at their head ends with pipes 58 and 59, respectively, for admission and exhaust of working fluid. Plungers 60 and 61 are fitted to slide in the cylinders and are engaged with opposite ends of the carriage in such manner as to exert thrust on the carriage when propelled by the working fluid. As here shown, the plungers have extensions of reduced diameter entering opposite ends of the passage 42 in the carriage, preferably being fitted friction tight therein, and shoulders 62 overlapping the rims of the passage ends.

These plungers have passages 63 extending lengthwise through them from end to end, in which secondary plungers 64 and 65 are fitted slidingly, one in each passage. The inner ends of plungers 64 and 65 bear on the ends of the displacer 39 and are adapted to apply thrust thereto for moving it in opposite directions when pressure is admitted alternately to the cylinders 56 and 57. As the resistance to movement of the plungers and displacer is less than that of the carriage, the working fluid admitted to either cylinder, while that in the other cylinder is free to escape, causes the displacer to be shifted and the cutters to be correspondingly displaced immediately and before enough pressure has been developed to move the carriage. It will be noted that the passages 63 are as large in transverse area as the ports 66 in the cylinders through which the working fluid enters, wherefore the fluid first to enter displaces the plunger and occupies the space left by its displacement before building up full operating pressure over the main plunger.

Admission and exhaust of the working fluid to and from the cylinders in alternation is controlled by the timing means of the machine, and preferably in such manner that the carriage makes a multiplicity of strokes during the traverse of the work gear in each direction across the path of the cutters. At the end of each return traverse of the work carrigae 13, the work is indexed as described in the said prior patent.

It is not a critical factor of the invention that the cutter carriage and cutters be operated hydraulically, for wholly mechanical means, such as cranks and connecting linkages may be applied for the same purpose, as understood by persons skilled in the art.

Instead of the single toothed cutters above described, cutters having multiple teeth arranged like the teeth of a rack may be used. Figs. 5 and 6 show one such multiple toothed cutter designated 67 mounted in substitution for the cutter C of the holder 29. This cutter is formed with web portions 68 secured to the holder by bolts 69 which may be set into the same tapped holes which receive the bolts 33 of the hold down clamp blocks 32 for the previously described cutter.

The use of opposed cutters, whether having a single tooth or a multiplicity of teeth, enables cutting to be performed on each stroke of the cutter carriage in opposite directions and, by mounting the cutters so that the cutting edges of one are separated by only a short distance from those of the other, the stroke need be but slightly longer than the minimum length needed to generate teeth with a single cutter. This double action practically doubles the amount of work capable of being performed by a single machine.

Figure 7:
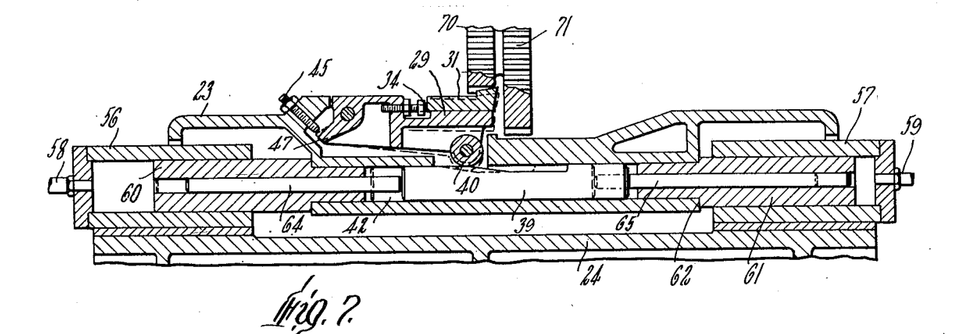
Fig. 7 is a sectional view similar to Fig. 2 showing a carriage and a single cutter arranged for generating teeth in a gear adjacent to a shoulder.

The machine can, however, be adapted to cut gears close to a shoulder by removing one of the cutters, or by substituting a carriage equipped with only a single cutter holder. Such a substitution is shown in Fig. 7 for generating a gear 70 adjacent to a shoulder which, in this instance, is a gear 71 of larger diameter. In all respects except the omission of one of the cutter holders, the carriage, the cutter holder, and their operating means are the same as previously described.

Figure 8:
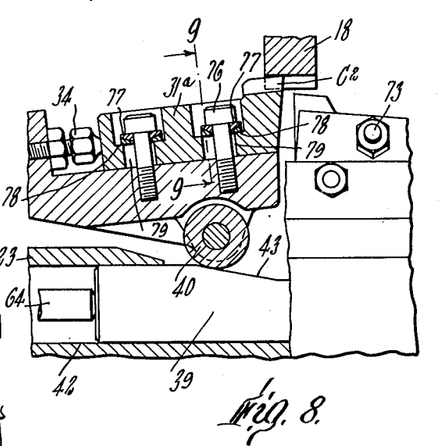
Fig. 8 is a detail sectional view of one of the cutters on a larger scale than that of the preceding figures, combined with means for adjusting it angularly through a limited range.
Figure 9:
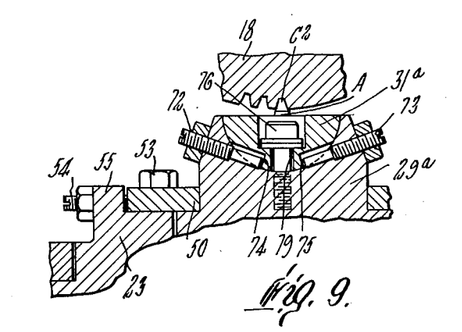
Fig. 9 is a cross section on line 9—9 of Fig. 8.

Figs. 8 and 9 show provisions for imparting an angular adjustment to a single toothed cutter about an axis extending lengthwise of the cutter tooth, in addition to the lateral adjustment previously described. The axis in this intance is located at A in the root of the tooth $C^2$, but may be located elsewhere, and it extends in the direction of the reciprocating travel of the carriage. The body portion 31a of this cutter is curved concentrically with the axis A and is seated in a complemental recess in the upper side of the holder 29a. Adjusting screws 72 and 73 are mounted in the holder at opposite sides thereof in locations tangential to the recess and their inner extremities abut against shoulders 74 and 75 of the cutter body. The hold down bolts 76 which secure and clamp the cutter body to the holder have heads, each of which bears against a pair of washers 77 and 78 seated in a recess of the body, these washers having curved abutting faces of which the center of curvature lies in the axis A, or near enough thereto to permit a solid bearing of the bolt head on the washer 77 and a solid bearing of the washer 78 on the cutter body. The holes 79 in the body through which the bolts pass are large enough to permit both lengthwise and angular adjustment of the cutter.

As thus far described, the machine is equipped and adapted to generate spur gears. It can, however, be adjusted to cut helical gears by turning the stool 25 about its axis of rotation to an angle corresponding to the helix angle of the gear to be generated. When single toothed cutters are used, no other change is needed. Multiple toothed cutters can also be used in this situation by the substitution of cutters such as the cutters 80 and 81 shown in Figs. 10, 11 and 12, of helical rack character, for the spur rack type cutters 67 and the like. The teeth of the substituted helical rack type are arranged in inclined rows which make an angle with the direction of reciprocation complemental to the prescribed helix angle. The cutters 80 and 81, and those with teeth arranged at different angles, can be secured to the cutter holders in the same way as described with respect to the cutter 67.

Figures 10, 11, 12, 13, 14, 15:
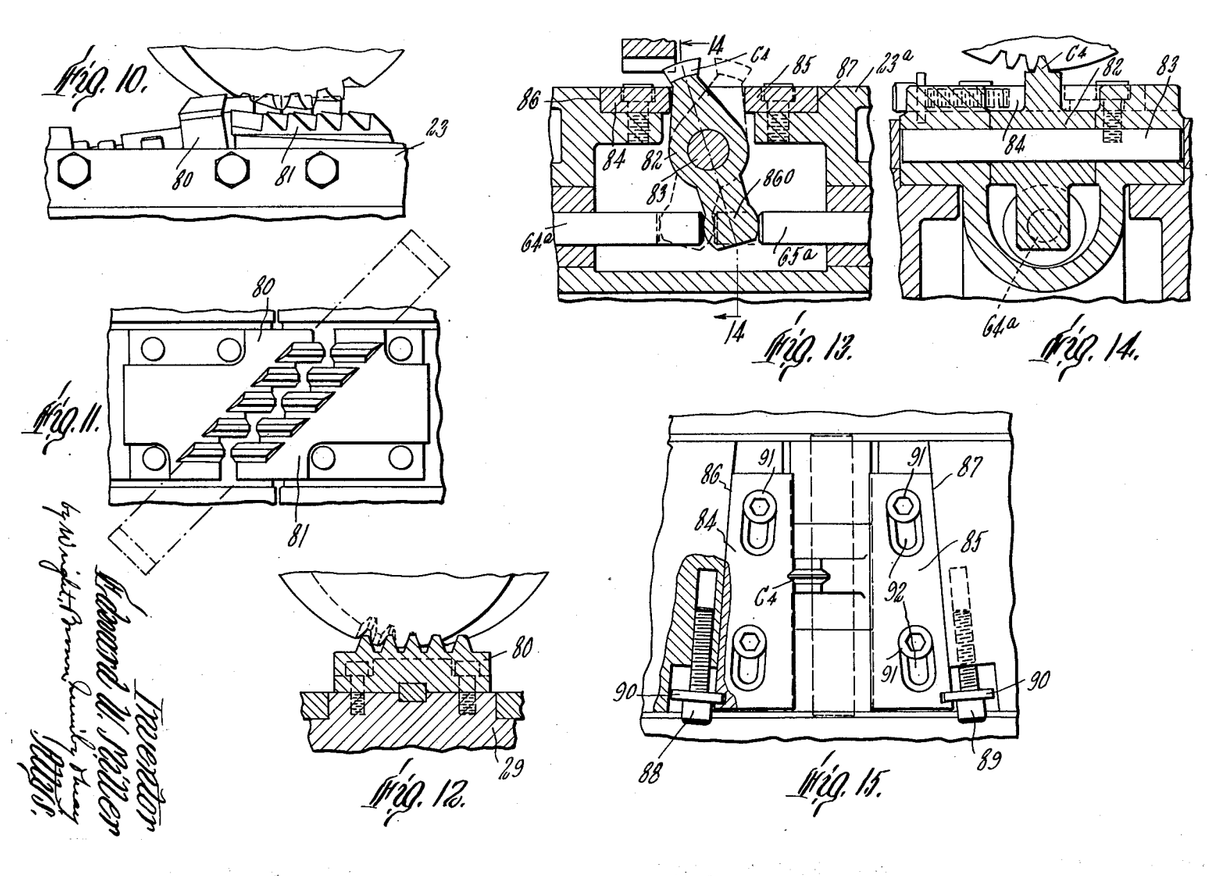
Figs. 10, 11 and 12 are, respectively, a side elevation, a plan view and a cross section of cutters having angularly disposed teeth for generating helical gears.
Fig. 13 is a longitudinal sectional view of the central part of the cutter carriage shown in the preceding figures with a single double acting cutter mounted thereon in place of the opposed cutters shown in Fig. 2.
Fig. 14 is a cross section on line 14—14 of Fig. 13.
Fig. 15 is a plan view of the structure shown in Fig. 13.

A modification having a single double acting cutter instead of two single acting opposed cutters is shown in Figs. 13, 14 and 15. This cutter is designated as a whole by the reference numeral 82. It is mounted in a recess in the cutter carriage 23a by a pivot 83, the axis of which is transverse both to the path of the carriage and to the radius of that portion of the gear which is presented for cutting. It has on its extremity which protrudes from the recess, a cutting tooth $C^4$. This tooth is a segment of a circular rib surrounding the axis of the pivot 83. Its section or profile in planes radial to the pivot axis is that of a rack tooth conjugate to the tooth forms to be generated. Opposite ends of the segmental tooth $C^4$ are ground off to form cutting edges at the sides and crest of the tooth, and end faces which are substantially radial to the axis and may be undercut sufficiently for desired top rake.

Opposite ends of the cutter tooth are put into position for cutting preliminary to travel of the carriage in opposite directions by plungers 64a and 65a in cooperation with abutments 84 and 85 at the boundaries of the recess. Plungers 64a and 65a are essentially like the plungers 64 and 65, and may be operated by the same means and in the same way in conjunction with reciprocations of the carriage. They act at their inner ends on an arm 86θ of the cutter body which projects between them. Plunger 64a acts preliminary to travel of the carriage from left to right (with respect to the showing in Figs. 13 and 15), thereby bringing the cutter body against abutment 84 and placing the right hand end of the cutter tooth in cutting position; while plunger 65a places the cutter against the abutment 85, making the left hand end of the tooth effective. The drawing shows the situation at the end of the cutting stroke from left to right. The abutments 84 and 85 are seated in rabbets in the cutter carriage bearing at their outer sides against shoulders 86 and 87, respectively, which are convergently inclined transversely of the carriage, while the inner edges or boundaries of the abutments are parallel to one another. They are adjustable transversely of the carriage whereby their inner edges are displaced lengthwise of the carriage, so as to locate either end of the cutter tooth at the proper angle for cutting and to compensate for removal of stock in sharpening. Screws 88 and 89, threaded into the carriage, and having flanges 90 entering notches in the abutments serve to adjust the abutments. They are secured in adjusted position by bolts 91 passing through slots 92 into tapped holes in the carriage structure.

The curvature of the cutter tooth around pivot 83 provides sufficient clearance to avoid contact with the work anywhere except at the cutting edges, wherefore the profile of the tooth can be the same in all radial planes and each end is equally serviceable for cutting.

Although the cutter just described has only a single tooth, cutters otherwise like this one but having a multiplicity of teeth in side by side arrangement similar to that of either Fig. 5 or Fig. 7 may be used as well.

The principle of a double acting machine with opposed cutters may be applied with the use of circular gear shaping cutters as well as with rack type cutters, and Figs. 16–20 inclusive show such an embodiment of the principle. In this case two circular gear shaper cutters $C^5$ and $C^6$ are provided mounted on rotatable and reciprocable spindles 93 and 94, respectively. As here shown, these spindles are mounted horizontally in essential alinement (except for the slight misalinement due to backing off), in cutter saddles 95 and 96 supported by pivots 97 and 98 in a casing 99 mounted on a base 100. This base supports a work carriage 101 in which a work spindle 102 is rotatably mounted adapted to carry a work gear 103 in proximity to the cutters. The work spindle is parallel to the cutter spindles and the work carriage is movable on the base 100 to carry the work gear toward and away from the cutters and enable work gears of different diameters to be operatively located. A screw 104 rotatable by a hand wheel 105 serves for thus adjusting the carriage.

The cutter spindles and work spindle are rotated at the correct speed ratio for generating teeth by a motor 106 through transmission trains. The train for driving the work spindle is shaft 107 driven by a belt 108 and pulley 109 from the motor, change gears 110, 111, 112, 113, shaft 114, worm 115 and worm gear 116 keyed to the work spindle and meshing with the worm. Shaft 114 is coupled with the worm by a telescopic shaft section 117 carried by the work carriage and with which the shaft 114 has splined connection, whereby the transmission of power is effective in all positions of the carriage. The train for driving the cutter spindles consists of the shaft 107, a bevel gear 118 thereon meshing with a bevel gear 119 on a cross shaft 120, two worm shafts 121 and 122 (one for each cutter spindle) driven by shaft 120 through pinion and face gear couples 123 and 124, worms 125 and 126 on shafts 121 and 122, a worm gear 127 on spindle 94, meshing with worm 125, and a worm gear 128 on spindle 93 meshing with worm 126. Rotation is transmitted from the last named worm gears to the spindles through couplings in the nature of splines or guides which permit relative endwise movement of the spindles. These couplings may be like those shown in my prior Patent No. 2,034,765, granted March 24, 1936, or of any other suitable design well known in the art of gear shaping machines.

Reciprocating movement is imparted to the cutter spindles from a motor 129, a crank shaft 130 driven by the motor through a belt and pulley transmission 131, 132, a crank pin 133, a connecting rod 134, and levers 135 and 136 which carry gear segments on one arm meshing with encircling rack teeth 137 and 138 on the respective spindles. These levers are pivoted on the pivots 98 and 97 of the respective cutter saddles and are coupled together by a link 139 so arranged as to cause them to reciprocate in unison and both in the same direction at the same time. The crank pin is adjustable radially on a crank disk 140, the connecting rod 134 is of telescopic construction so as to be extensible and contractable in length, and the link 139 is made of two sections and a coupling 141 in threaded connection with right and left hand threads on the adjacent extremities of the two sections, whereby the link can be lengthened and shortened. By means of these adjustments, the length and position of the strokes of the cutters, and the clearance space between them, may be varied.

Figures 16, 17, 18:
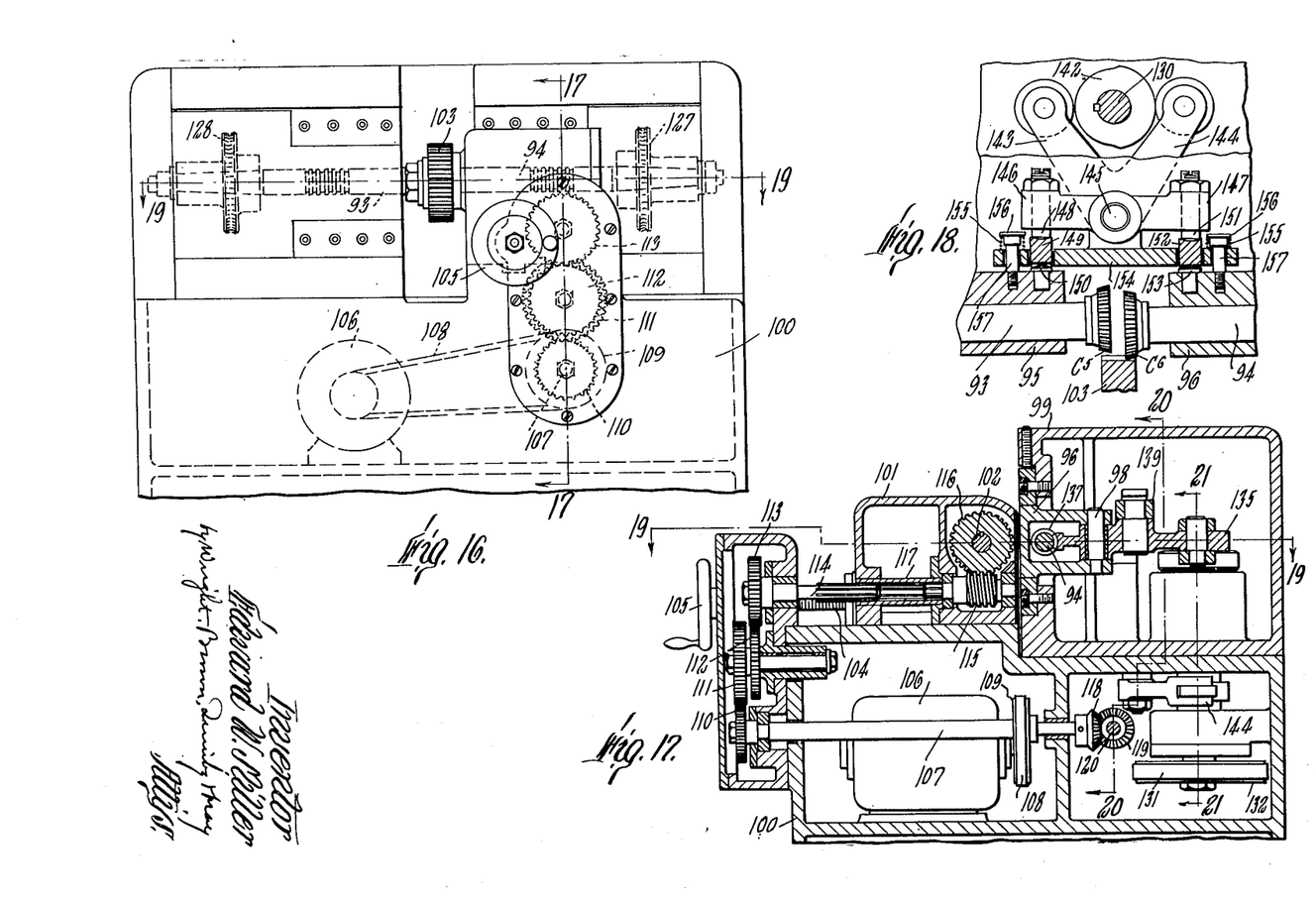
Fig. 16 is a front elevation of a machine embodying the invention having opposed circular gear shaper cutters.
Fig. 17 is a vertical cross section taken on line 17—17 of Figs. 16, 19, and 20.
Fig. 18 is a schematic view partly in section and partly in elevation showing the means for backing off the cutters and advancing them in alternation.

The cutters are backed off before making their non cutting strokes and returned to the cutting path at the beginning of their cutting strokes by swinging movement of their saddles about the pivots 97 and 98 effected by the following means. A cam 142 on the crank shaft 130 is embraced by the arms 143 and 144 of a yoke carried by a rock shaft 145, these arms carrying rollers which are adapted to bear on the circumference of the cam at opposite ends of a diameter thereof. The rock shaft carries two other arms 146 and 147 in the same plane with the cutter spindles. Arm 146 carries an adjustable stud 148 which transmits thrust through a bar 149 on an abutment 150 carried by the saddle 95, while the arm 147 carries a similar adjustable stud 151 arranged to apply thrust through a bar 152 on an abutment 153 carried by the saddle 96. The bars 149 and 152 are movable endwise through guideways in a web 154 which forms part of the machine frame and supports the bearings for rock shaft 145. As shaft 145 is transverse to the spindle and located at the opposite side of the cutters from the work piece, its oscillations cause thrust to be applied alternately to the two cutter saddles in a manner to bring and hold the cutters alternately up to the work. Retracting force is applied constantly to the saddles by springs 155 interposed between the web 154 and flanges 156 on the ends of pins 157 which are mounted in the saddles and pass freely through the web; all as shown in Fig. 18. These springs take up all looseness and backlash in the transmission mechanism from the cam to the respective cutter saddles.

The cam has a high dwell and a low dwell each including nearly 180° of arc with a short rise and a short descent between them, and is set on the crank shaft so that its high dwell acts on yoke arm 143 while the cutters travel from left to right (with respect to Figs. 18 and 19), and on the yoke arm 144 while the cutters travel from right to left; thus positively holding each cutter up to the work during the cutting strokes and permitting its retraction throughout the non cutting strokes.

It will be appreciated from the foregoing disclosure that the principles of the invention are capable of embodiment in diverse forms and combinations. The embodiments here shown are not exhaustive, and others are within the scope of this invention. Factors common to all are that in each stroke one set of cutting edges having the outline of a gear tooth (and in this statement a rack tooth is considered to be a gear tooth of special form), is carried all the way through the work from end to end thereof or, in other words, throughout the face width of the gear; and that in making each cutting stroke the active cutting edges generate portions of the face curves of two teeth, as in the standard practice of gear shaping. The cutting action of each cutter tooth simultaneously on the adjacent faces of two of the teeth being generated is plainly shown in the sectional views, Figs. 4, 6, 9, 12 and 14.

Figures 19, 20, 21:
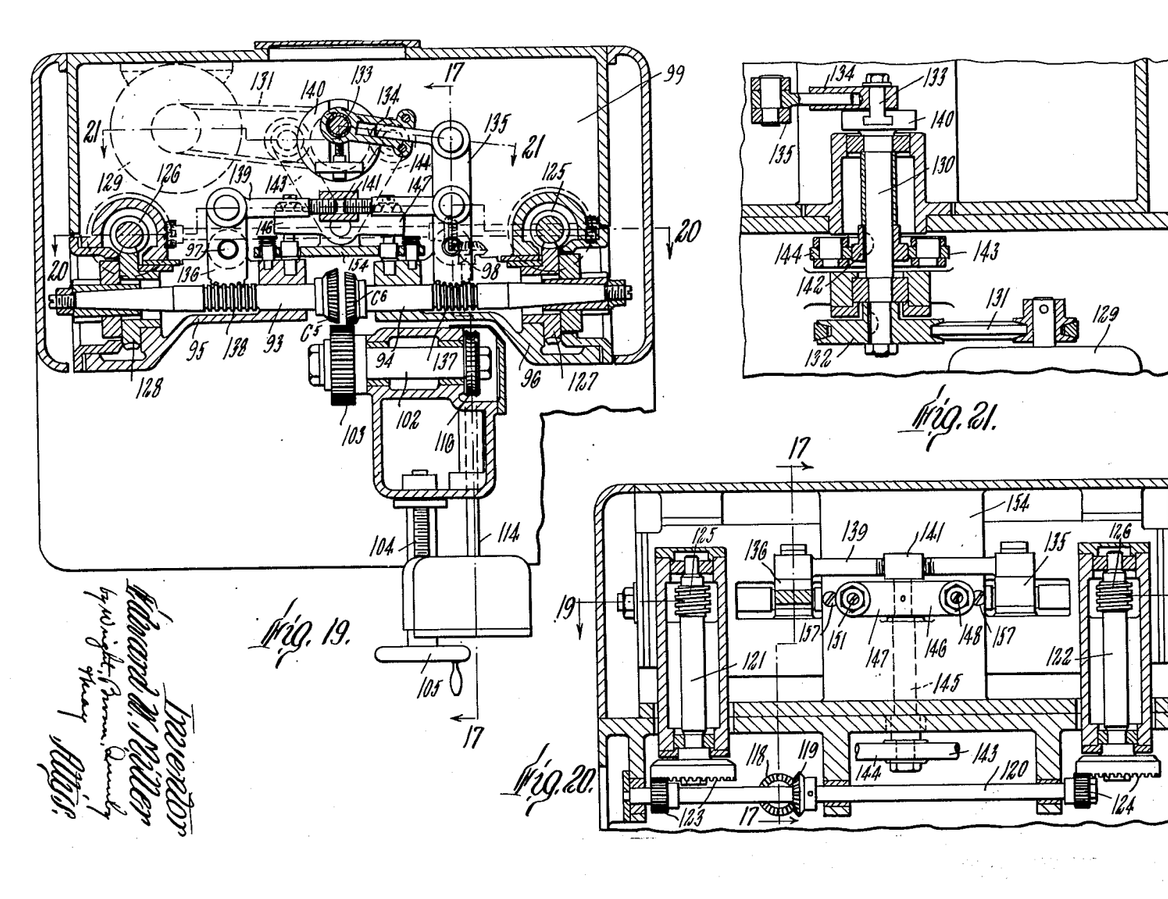

In the generic definition of the principles of this invention, a cutter of rack type is equivalent to one of circular gear type, and the term "gear tooth" is used in some of the appended claims in a generic sense as defining the outlines of the teeth of both the rack type cutters shown in Figs. 1–15 and the circular cutters shown in Figs. 18 and 19.

What I claim and desire to secure by Letters Patent is:

1. In a gear shaping machine, a supporting structure, a carriage mounted to reciprocate on said supporting structure, a cutter holder pivoted to the cutter carriage, a shaping cutter secured to said holder having a cutting end which is movable into and out of a cutting path by movement of the holder about its pivotal connection with the carriage, a displacer carried by the carriage and movable relatively thereto having a cam surface on which the cutter holder bears arranged to cause shifting of the holder about its pivot according as the displacer is moved relatively to the carriage in one direction or the other, and means whereby the carriage is reciprocated and the displacer is moved relatively to the carriage when the carriage movement is reversed.

2. In a gear shaping machine, a supporting structure, a carriage mounted for reciprocating movement on said supporting structure, two cutter holders pivoted to the carriage at points spaced apart lengthwise of the carriage and on axes transverse to the path of the carriage, said cutter holders extending toward each other from their pivotal connections, cutters opposed to one another mounted on the respective holders, a displacer mounted on the carriage and movable relatively thereto, said displacer having surfaces on which portions of both cutter holders bear, and such surfaces being disposed to cause displacement of the holders around their pivotal connections when the displacer is moved relatively to the carriage in either direction.

3. In a gear shaping machine, a supporting structure, a cutter carriage mounted to reciprocate on said structure, cutter holders pivoted to the carriage on axes transverse to the path of the carriage and spaced apart lengthwise of said path, said holders extending from their respective pivots toward one another, shaping cutters mounted on the respective holders extending toward one another and having cutting edges on their adjacent ends, a displacer mounted on the carriage with provision for movement relatively thereto in the direction of the carriage travel having surfaces inclined to the direction of its movement against which portions of the cutter holders bear, said surfaces being so arranged that movement of the displacer in either direction causes outward movement of one holder and inward movement of the other with respect to the carriage, and means for moving the displacer back and forth in time with reciprocations of the carriage.

4. In a gear shaping machine, a supporting structure, a carriage mounted thereon for reciprocating movement, a cutter holder in pivotal connection with the carriage for movement about an axis transverse to the direction of travel of the carriage, guides on the carriage embracing said holder and between which the holder is capable of moving, and adjusting means mounted on the carriage in engagement with said guides for shifting them and the holder transversely of the carriage path.

5. In a gear shaping machine, a supporting structure, a carriage mounted thereon for reciprocating movement, a cutter holder in pivotal connection with the carriage for movement about an axis transverse to the direction of travel of the carriage, guides on the carrriage embracing said holder and between which the holder is capable of moving, adjusting means mounted on the carriage in engagement with said guides for shifting them and the holder transversely of the carriage path, a cutter having a body portion and a cutting tooth connected to said holder, the body portion of the cutter and that part of the holder on which it is mounted being curved concentrically with an axis substantially parallel to the said path, and means for securing the cutter to the holder in various positions of angular adjustment about said axis.

6. In a machine of the character described, a cutter holder having a recess of which the bounding wall is curved concentrically with an axis to form a bearing surface, a cutter mounted in said holder and having a body portion with a curved bounding surface complemental to said recess wall and engaging said bearing surface, an adjusting screw extending into said recess tangentially of the bounding wall, the cutter having a shoulder against which said screw abuts, whereby the screw is enabled to adjust the cutter about the axis of curvature of said wall, and means for securing the cutter to the holder in its various adjusted positions.

7. In a gear shaping machine, a supporting structure, a cutter carriage mounted to reciprocate on said structure, a cutter holder in pivotal connection with the carriage for movement about an axis transverse to the direction of travel of the carriage, having a recess of cylindrical curvature of which the axis is substantially parallel to said direction of travel, a cutter having a body portion with an external surface complemental to said recess seated therein, and having a tooth projecting laterally from the body located adjacent to said axis and having cutting edges substantially in a plane perpendicular to said axis having an outline like the profile of a gear tooth, and means for securing the cutter in said recess in various positions of angular adjustment about said axis.

8. A gear shaping machine comprising a supporting structure, cutter carrying means on said supporting structure, a pivotal mounting for said cutter carrying means, cutters on said carrying means facing opposite to one another, mechanism for reciprocating said cutters, a work support, means for effecting a relative generative movement between the work support and said cutters, means to impart a relative reciprocating movement between said cutters and work support, a displacer moveable relative to said cutter carrying means constructed and arranged to act on said cutter carrying means to shift said cutter carrying means about said pivotal mounting so as to bring said cutters alternatively into cutting position in time with their reciprocation.

9. A gear shaping machine comprising a supporting structure, cutter carrying means on said supporting structure, a pivotal mounting for said cutter carrying means, cutters on said carrying means facing opposite to one another, mechanism for reciprocating said cutters, a work support, means for effecting a relative generative movement between the work support and said cutters, means to impart a relative reciprocating movement between said cutters and work support, a displacer moveable relative to said cutter carrying means, said displacer having a cam surface constructed and arranged to act on said cutter carrying means to shift said cutter carrying means about said pivotal mounting so as to bring said cutters alternatively into cutting position in time with their reciprocation.

10. A gear shaping machine comprising a supporting structure, cutter carrying means on said supporting structure, a pivotal mounting for said cutter carrying means, cutters on said carrying means facing opposite to one another, mechanism for reciprocating said cutters, a work support, means for effecting a relative generative movement between the work support and said cutters, means to impart a relative reciprocating movement between said cutters and work support, a displacer moveable relative to said cutter carrying means, said displacer having a cam surface abutting said cutter carrying means and constructed and arranged to act on said cutter carrying means to shift said cutter carrying means about said pivotal mounting so as to bring said cutters alternatively into cutting position in time with their reciprocation.

EDWARD W. MILLER.

References Cited in the file of this patent

UNITED STATES PATENTS

| Number | Name | Date |
|---|---|---|
| 298,268 | Angus | May 6, 1884 |
| 1,041,984 | Eggers | Oct. 22, 1912 |
| 1,088,173 | Perrot | Feb. 24, 1914 |
| 1,285,413 | Schipper | Nov. 19, 1918 |
| 1,290,270 | Maag | Jan. 7, 1919 |
| 1,466,899 | Hanson | Sept. 4, 1923 |
| 1,507,992 | Ellis | Sept. 9, 1924 |
| 1,638,874 | Palmer | Aug. 16, 1927 |
| 1,715,844 | Kienzl | June 4, 1929 |
| 1,750,080 | Sykes | Mar. 11, 1930 |
| 1,908,195 | Sunderland et al. | May 9, 1933 |
| 2,136,266 | Reinecker | Nov. 8, 1938 |
| 2,255,094 | Aeppli | Sept. 9, 1941 |
| 2,282,193 | Lambrix | May 5, 1942 |
| 2,364,065 | Frederichs | Dec. 5, 1944 |
| 2,386,572 | Pigott | Oct. 9, 1945 |
| 2,432,020 | Laesser | Dec. 2, 1947 |